June 17, 1930.  E. ERLENBACH  1,764,249
PROCESS OF TREATING SAWDUST
Filed Aug. 12, 1926
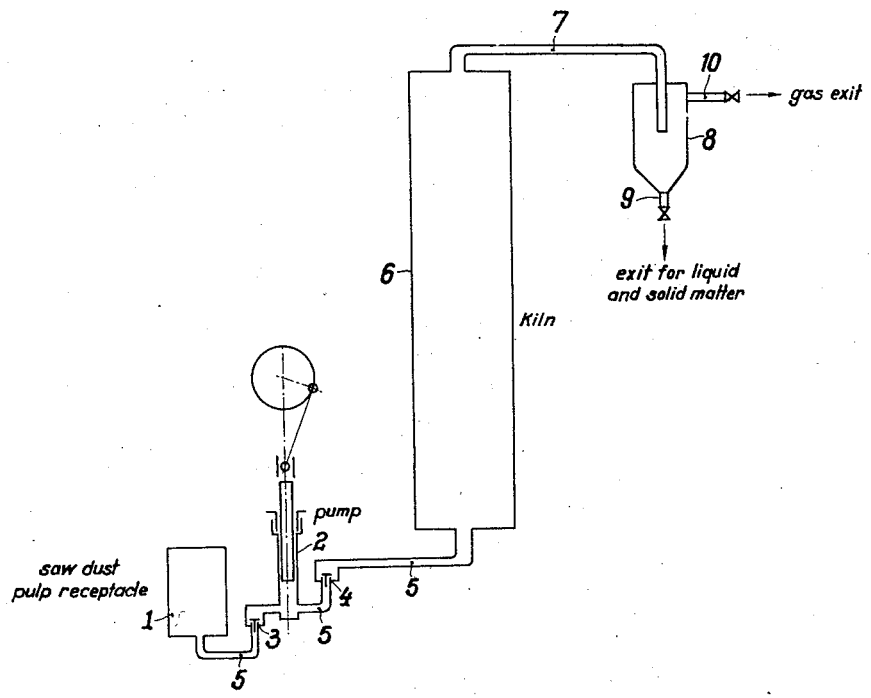
Inventor:
Edgar Erlenbach
by
Byrnes Townsend & Bruckenstein
his ATTORNEYS Patented June 17, 1930

1,764,249

UNITED STATES PATENT OFFICE

EDGAR ERLENBACH, OF BERLIN, GERMANY

PROCESS OF TREATING SAWDUST

Application filed August 12, 1926, Serial No. 128,911, and in Germany August 18, 1925.

In the wood industry large quantities of saw dust are formed which often-times are a cumbersome waste product which mainly is only used as fuel, although it is known that by heating it under high pressure valuable products such as acetic acid, methyl alcohol, acetone can be obtained therefrom together with tarry substances.

This invention has for its purpose to make use of this fact in an industrial process which process comprises the forming of a pulp from such saw dust with an aqueous liquid, the transporting of same through a high pressure apparatus wherein it is subjected to elevated temperature of about 350° C. at the pressure corresponding to such temperature which pressure is below 200 atmospheres at the temperature of 350° C., and the recovering of the products which are formed under such conditions. The terms "high pressure apparatus" and "pressure proof apparatus" as used in the specification and claims are intended to denote apparatus adapted to withstand high pressures up to about 250 atmospheres. It will be obvious that the pressure existing in the system at any given temperature will correspond to the vapor pressure of the aqueous medium at that temperature.
The essential point in this invention consists therein that it has been found to be practicable to continuously move a watery saw dust pulp through a conduit by a suitable pumping action.
The friction resistance of the pulp against progressing movement within a conduit largely depends upon the nature of the saw dust pulp and upon the aqueous liquid wherein the saw dust is suspended or with which it is impregnated. Particularly with a view to reduce the frictional resistance it is advisable to use a caustic alkali solution as the aqueous liquid with which the pulp is formed, such caustic alkali solution forming soap like compounds with certain constituents of the saw dust which have the effect of lubricants. The presence of caustic alkali within the reaction system is moreover advantageous for the reaction process in this regard that acetic acid formed in the process is bound to alkali so that the damaging influence of the acid on the reaction apparatus is avoided.

The quantity of added alkali should be so calculated that good lubrication is secured by the combined action of the added alkali and water. Suitable amounts of water and alkali are given in the following examples.

The process is illustrated by the following specific examples.

Example 1

Air dry saw dust of beech trees is intermixed with four times its weight of water and pressed by a suitable pumping device through a high pressure system with such velocity that it is subjected about two hours to a temperature of 300° C. at about 110 atmospheres; this temperature and pressure being the maximum reached within the system. A yield of 6% acetic acid 2½% methyl alcohol 1½% acetone and a good deal of tarry substance calculated on the air dry saw dust is obtained.

Example 2

Air dry saw dust of beech trees is mixed with a solution of 50% of its weight in potassium hydroxid in 80% of its weight in water and the mixture is driven through a pressure proof apparatus with such velocity that it is exposed for about two hours to a temperature of about 300° C. at about 150 atmospheres; this temperature and pressure being the maximum within the system. The velocity corresponding to a reaction period of two hours will vary directly with the capacity of the part of the high pressure system exposed to heat. Thus if the capacity of the system is 50 gallons the velocity necessary to obtain a two hour reaction period would obviously be 25 gallons per hour.

A yield of 11% potassium acetate, 3% methyl alcohol, 1½% acetone calculated on the weight of the air dry saw dust and a good deal of tar is obtained.

The process may be carried out in the apparatus schematically illustrated in the annexed drawing wherein 1 designates a bin or receptacle for the aqueous saw dust pulp; 2 is a pumping device which on its suction stroke opens a valve 3 and keeps closed a valve 4 provided in a channel 5 connecting receptacle 1 with a heating device or kiln 6 through which the saw dust pulp is moved by the pressure exerted thereon by the pump 2. Within the kiln 6 the saw dust is decomposed to solid carbonuaceous and gaseous matter under the influence of heat and pressure with simultaneous formation of acetic acid—either as free acid if the saw dust pulp is formed with pure water, or as acetate of alkali if the pulp is formed with an aqueous solution of caustic alkali—of methyl alcohol and acetone. The reaction products leaving the kiln pass through conduit 7 and enter a receptacle 8 wherein solid and liquid components settle down and can be withdrawn through exit 9 whereas the gaseous and vaporous constituents escape through conduit 10.

What I claim is:—

1. A process of decomposing sawdust which comprises transporting sawdust as an aqueous pulp for about two hours through a pressure proof system at a temperature at which the sawdust is appreciably decomposed and at a superatmospheric pressure corresponding to the vapor pressure of the aqueous pulp at said temperature.

2. A process of decomposing sawdust which comprises transporting sawdust as an aqueous pulp for about two hours containing caustic alkali through a pressure proof system at a temperature at which the sawdust is appreciably decomposed and at a superatmospheric pressure corresponding to said temperature.

3. A process of decomposing sawdust which comprises pumping sawdust as an aqueous pulp for about two hours through a pressure proof system at a temperature at which the sawdust is appreciably decomposed and at a superatmospheric pressure corresponding to the vapor pressure of the aqueous pulp at said temperature.

In witness whereof, I affix my signature.

Dr. EDGAR ERLENBACH.

CERTIFICATE OF CORRECTION.

Patent No. 1,764,249.  Granted June 17, 1930, to

EDGAR ERLENBACH.

It is hereby certified that error appears in the printed specification of the above numbered patent requiring correction as follows: Page 2, line 37, claim 2, after "corresponding to" insert the words "the vapor pressure of the aqueous pulp at"; and that the said Letters Patent should be read with this correction therein that the same may conform to the record of the case in the Patent Office.

Signed and sealed this 9th day of September, A. D. 1930.

(Seal)

M. J. Moore,
Acting Commissioner of Patents.